P. Harlow,
Belt Fastener,

Nº 61,935. Patented Feb. 12, 1867.

Witnesses.
L. M. Thayer.
C. W. Baldwin

Inventor.
by his Attorney
Frederick Curtis

United States Patent Office.

PHILANDER HARLOW, OF HUDSON, MASSACHUSETTS, ASSIGNOR TO HIMSELF AND ASA F. HALL.

Letters Patent No. 61,935, dated February 12, 1867.

BELT CLASP.

The Schedule referred to in these Letters Patent and making part of the same.

TO ALL TO WHOM THESE PRESENTS SHALL COME:

Be it known that I, PHILANDER HARLOW, of Hudson, in the county of Middlesex, and State of Massachusetts, have invented a new and useful Machine Belt Fastening, and do hereby declare the following to be a full, clear, and exact description thereof, reference being had to the accompanying drawings, making part of this specification, and in which—

Figure 2 is a longitudinal section of the same; while

The object of this invention is to produce a simple and effective fastening for confining together the ends of a machine belt or band, it being intended to take the place of the ordinary leather lacings, or the metallic clasps now in use, and which require for their application a number of holes to be punched in each end of the belt.

Figure 1:
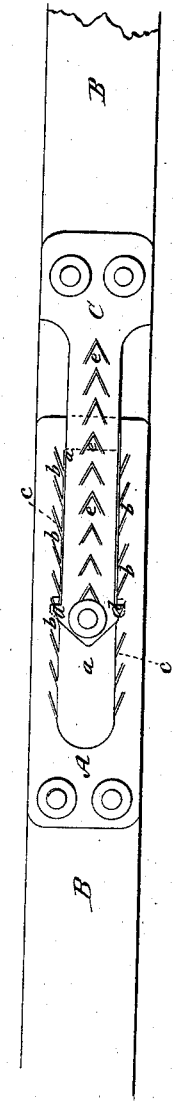
Figure 1 is a top or outer face view of my invention as applied to a belt.
Figure 2:
Figure 3:
Figure 3 is a section of one of its connecting plates, to be hereinafter described.

The nature of the said invention, and its construction and operation, may be thus described:

In the drawings above mentioned, A denotes a flexible metallic plate firmly secured at one extremity to the belt B, by rivets, or in any suitable manner, and extending somewhat beyond the end of the said belt, as shown in fig. 2. The plate A has a central slot or passage, $a$, made in it, the side edges or boundaries of this slot being serrated or formed with angular teeth $b\ b\ b$, etc., the points of which are turned inward toward the belt, thus forming narrow converging notches $c\ c\ c$ between them, the shape and inclination of these teeth and notches being shown in fig. 3 of the drawings. A second metallic and flexible plate C, corresponding in size with, or a little smaller than, the slot $a$ of the plate A, is fixed at both its ends to the opposite end of the belt B, which overlaps the end of the belt first mentioned, in order that the metallic plates shall not come in contact with the surface of the pulley upon which the belt may be travelling. The plate C overlaps one end of the plate A, and has two lateral projections or points $d\ d$ on its inner extremity, which extend underneath the plate A, or that portion of it constituting the sides of the slot $a$, the said projections $d\ d$ operating with or locking into the notches $c\ c$, etc., before referred to, and securing the two ends of the belt B together. For the purpose of greater security, however, the plate C may have a series of triangular teeth, $e\ e\ e$, etc., formed in it by making indentations in the metal composing it, the points of the teeth projecting inward to strike against the outer extremity of the slot $a$; the construction of these teeth, as well as their connection with the plate A, being shown in figs. 1 and 2 of the drawings, they being the same distance apart as the teeth $b\ b\ b$. To shorten the belt by means of the above-described apparatus it is only necessary to slip the projections $d\ d$ of the plate C from one to another of the teeth $b\ b$, the distance necessary to effect the tightening of the belt, the strain of the belt subsequently serving to retract the projections into due connection with the teeth $b\ b\ b$, etc., of the plate A, and securely lock the ends of the belt in this position.

The advantages of my invention, besides the fact of enabling a belt to be shortened very expeditiously, are, that the belt is not weakened by punching a number of holes in it as it is now the case, it being known that this is highly injurious. It is also well known that a belt first gives out at or near its ends, from this cause, and by abrasion upon its edges against the pulley. The metallic plates, of my invention, serve to protect these parts so that they will outwear the rest of the belt. Furthermore, in my invention the belt does not require to be cut in order to shorten it, the overlapping of the ends obviating this objection. Another objection to the old mode, which my invention obviates, is the fact that the belt cannot be shortened or "taken up" a little without punching new holes so near the old ones as to nearly destroy it.

I claim the belt fastening composed of the two plates A and C, constructed and operating together in manner and for the purpose substantially as described.

PHILANDER HARLOW.

Witnesses:
GEO. S. RAWSEN,
GEO. SPOEREL.